US008428814B2

(12) United States Patent
Tripathi et al.

(10) Patent No.: US 8,428,814 B2
(45) Date of Patent: Apr. 23, 2013

(54) METHOD OF VERIFYING REGULATORY COMPLIANCE OF A VEHICLE HAVING A VEHICLE DIAGNOSTIC SYSTEM

(75) Inventors: Pradeep R. Tripathi, Miami Beach, FL (US); Lothar Geilen, Ann Arbor, MI (US)

(73) Assignee: SysTech International, LLC, Ann Arbor, MI (US)

( * ) Notice: Subject to any disclaimer, the term of this patent is extended or adjusted under 35 U.S.C. 154(b) by 1023 days.

(21) Appl. No.: 11/890,662

(22) Filed: Aug. 7, 2007

(65) Prior Publication Data

US 2007/0276561 A1 Nov. 29, 2007

Related U.S. Application Data

(63) Continuation of application No. 10/248,240, filed on Dec. 30, 2002, now abandoned.

(60) Provisional application No. 60/345,524, filed on Jan. 3, 2002.

(51) Int. Cl.
*G06F 19/00* (2006.01)
*G06F 7/00* (2006.01)

(52) U.S. Cl.
USPC .............................................. 701/33; 701/29

(58) Field of Classification Search .................... 701/33, 701/29, 30, 35; 713/200; 702/182; 340/438, 340/439, 450, 425.5; 73/116, 117.2
See application file for complete search history.

(56) References Cited

U.S. PATENT DOCUMENTS

| | | | |
|---|---|---|---|
| 4,494,114 | A | 1/1985 | Kaish |
| 4,602,127 | A | 7/1986 | Neely et al. |
| 4,728,922 | A | 3/1988 | Christen et al. |

(Continued)

FOREIGN PATENT DOCUMENTS

| | | | |
|---|---|---|---|
| WO | 01/84380 | A1 | 11/2001 |
| WO | 01/86576 | A1 | 11/2001 |

OTHER PUBLICATIONS

European Search Report from corresponding European Patent Application No. 02796140.8-2215 dated Feb. 28, 2006.

(Continued)

*Primary Examiner* — Ronnie Mancho
(74) *Attorney, Agent, or Firm* — Gardner, Linn, Burkhart & Flory, LLP

(57) ABSTRACT

A method of verifying regulatory compliance of a vehicle having a vehicle diagnostic system includes providing a vehicle unit having an adapter that is configured to connect with a vehicle diagnostic port of the vehicle diagnostic system. The vehicle unit further includes a vehicle wireless transceiver and a memory. The adapter is connected with the vehicle diagnostic port and receives vehicle data including exhaust emission parameters. The vehicle data is stored in the memory. A communication network is provided for two-way wireless communication with the vehicle unit. The communication network is made up of a plurality of geographically dispersed wireless communication transceivers. The vehicle wireless communication transceiver is activated with one of the geographically dispersed wireless communication transceivers when the vehicle wireless communication transceiver is in a vicinity of that geographically dispersed wireless communication transceiver to communicate the stored vehicle data to that one of the geographically dispersed wireless communication transceivers. A host computer system with access to the communication network receives vehicle data from the geographically dispersed wireless communication transceivers. A database accessed by the host computer system collects environmental regulatory compliance data. Environmental authority is provided access to the database to verify regulatory compliance.

29 Claims, 7 Drawing Sheets

U.S. PATENT DOCUMENTS

| | | | | |
|---|---|---|---|---|
| 5,414,626 | A | 5/1995 | Boorse et al. | |
| 5,582,286 | A | 12/1996 | Kalm et al. | |
| 5,726,450 | A | 3/1998 | Peterson et al. | |
| 5,870,018 | A * | 2/1999 | Person et al. | 340/5.65 |
| 5,884,202 | A | 3/1999 | Arjomand | |
| 5,916,287 | A | 6/1999 | Arjomand et al. | |
| 6,055,468 | A | 4/2000 | Kaman et al. | |
| 6,094,609 | A | 7/2000 | Arjomand | |
| 6,107,933 | A * | 8/2000 | Endo | 340/5.28 |
| 6,240,335 | B1 | 5/2001 | Wehrung et al. | |
| 6,253,906 | B1 | 7/2001 | Hall | |
| 6,408,170 | B1 * | 6/2002 | Schmidt et al. | 455/344 |
| 6,408,232 | B1 | 6/2002 | Cannon et al. | |
| 6,484,080 | B2 | 11/2002 | Breed | |
| 6,542,069 | B1 * | 4/2003 | Rathgeber | 340/5.3 |
| 6,594,579 | B1 | 7/2003 | Lowrey et al. | |
| 6,604,033 | B1 | 8/2003 | Banet et al. | |
| 6,636,790 | B1 * | 10/2003 | Lightner et al. | 701/33 |
| 6,729,463 | B2 | 5/2004 | Pfeiffer | |
| 6,732,032 | B1 | 5/2004 | Banet et al. | |
| 6,735,503 | B2 | 5/2004 | Ames | |
| 6,775,602 | B2 * | 8/2004 | Gordon et al. | 701/33 |
| 6,836,708 | B2 | 12/2004 | Tripathi | |
| 6,959,804 | B2 | 11/2005 | Helgerson et al. | |
| 2002/0059075 | A1 | 5/2002 | Schick et al. | |
| 2003/0130774 | A1 | 7/2003 | Tripathi et al. | |

OTHER PUBLICATIONS

International Search Report (Form PCT/ISA/210) from corresponding Patent Cooperation Treaty Application No. PCT/US02/41838, dated Mar. 31, 2003.

Article entitled "Have You Heard About OBD III?," AutoInc. Magazine, vol. XLIV, No. 5, May 1996.

* cited by examiner

METHOD OF VERIFYING REGULATORY COMPLIANCE OF A VEHICLE HAVING A VEHICLE DIAGNOSTIC SYSTEM

CROSS REFERENCE TO RELATED APPLICATIONS

This application is a continuation of U.S. application Ser. No. 10/248,240 filed Dec. 30, 2002, which claims priority from U.S. provisional patent application Ser. No. 60/345,524, filed on Jan. 3, 2002, the disclosure of which are hereby incorporated herein by reference in their entireties.

BACKGROUND OF INVENTION

Mandated by USEPA and other government agencies throughout the world, OBD II (EOBD in Europe) was primarily developed for monitoring the vehicle's emission control systems by the Engine Control Module (ECM), which will typically display a general warning to the operator (the check engine light, or Malfunction Indicator Light-MIL) when a fault is detected. It also provides a means by which a mechanic or vehicle inspector can access engine parameters, readiness status and specific fault codes related to engine hardware that can affect emissions and engine performance. The OBD II system is accessible via a standardized communications link and cable, and a microprocessor device that implements various standardized communications protocol. Such device is known as a scan tool. Data from on-board sensors can be accessed by the scan tool at a rate of up to 50 Hz.

The United States Environmental Protection Agency (EPA) is currently taking a very clear stand in favor of OBD II (On-board Diagnostic) testing for vehicle emissions inspections, requiring all non-attainment areas to introduce OBD II testing for all vehicles (gasoline and diesel powered), model year 1996 and newer in lieu of tailpipe testing. OBD II interfaces for all vehicles model year 1996 and newer are standardized to allow for communication with an external microprocessor-based system. Canada has adopted OBD II standardization for all vehicles 1998 and newer. A very similar international system, called EOBD, is required for model year 1998 and newer vehicles in Europe. Similar systems are currently being placed in vehicles in Asian markets as well.

Current new and existing vehicle emission inspection programs typically all follow the following procedure:

The motorist drives to an inspection station when the vehicle's emission inspection is due.

The vehicle enters a dedicated inspection station.

The inspection station may charge a per test fee to the motorist.

The inspector identifies the vehicle (bar code, manually, etc.).

The inspector connects the OBD II scan tool to the vehicle's Data Link Connector (DLC) and performs the OBD download according to EPA and program regulations.

The inspector disconnects the scan tool from the vehicle.

The inspection results are logged, a VIR may be issued and the data may automatically be transmitted to a centralized database typically through a modem.

Current vehicle emission inspections are time consuming for the motorist, and expensive (rates vary between $15.00 to $25.00 and more per test). Therefore, inspections are only performed annually or biennially in order to reduce the burden for the motorist to a minimum. Vehicle performance and compliance between two inspections is not known and cannot be tracked.

SUMMARY OF INVENTION

The present invention addresses the disadvantages resulting from current inspection programs. The invention has the capability of providing much more data than is presently available to enforcing authority, such as authority charged with enforcing vehicle pollution compliance, as well as reducing cost and increasing convenience to the consumer. While the present invention is useful in enforcing compliance with vehicle emission regulations, it may be useful in processing vehicle data other than vehicle exhaust emission parameters in areas without emission testing requirements.

A vehicle inspection system and method of inspecting a vehicle, according to an aspect of the invention, includes providing a vehicle unit and a communications network. The vehicle unit receives vehicle data and has a wireless communication transceiver and a control for controlling the wireless communication transceiver. The control includes memory for storing vehicle data from the vehicle diagnostic system. A communication network provides wireless communication with the vehicle unit. The communication network is made up of a plurality of geographically dispersed generally wireless communication transceivers. The vehicle unit communicates the vehicle data in its memory to a wireless communication transceiver in the vicinity of the vehicle.

The vehicle data may include exhaust emission parameters. The vehicle unit may include an adapter that is configured to connect with a diagnostic port of the vehicle diagnostic system for receiving the vehicle data. The communication network may provide two-way wireless communication with the vehicle unit. In this manner, one of the geographically dispersed wireless communication transceivers may activate the vehicle wireless communication transceiver when the vehicle is in the vicinity of that geographically dispersed communication transceiver to communicate the vehicle data to that communication transceiver. The communication network may include a network connection at the geographically dispersed wireless communication transceivers with a wide area network, such as a global network, or the like. This provides for retrieving data from the stationary wireless communication transceivers. The wide area network provides access to the retrieved data at locations remote from the wireless communication transceivers.

The communication network may further include cameras with the geographically dispersed wireless communication transceivers. The cameras are operable to capture images of vehicles communicating the exhaust emission data. The communication network may include a host computer system on the wide area network that is operative to receive data from the wireless communication transceivers. Environmental authority may be provided access to the database for compliance verification. Additionally, a vehicle owner, such as an individual owner or a vehicle fleet operator, may be provided access to the database for vehicle performance monitoring.

A unique vehicle identification code may be provided wherein the vehicle code is transmitted with the vehicle data. The vehicle wireless communication transceiver may communicate auxiliary data, in addition to the other vehicle data in the memory, to one of the geographically dispersed wireless communication transceivers. The network connection may include at least one chosen from a high-speed installed connection, a wireless connection, such as a cellular connection, or a satellite connection. The control in the vehicle unit may be programmed through the vehicle transceiver with code received from the geographically dispersed wireless communication transceivers. The communication network may track the geographic location of the vehicle unit.

These and other objects, advantages and features of this invention will become apparent upon review of the following specification in conjunction with the drawings.

DESCRIPTION OF THE PREFERRED EMBODIMENTS

Figure 1:
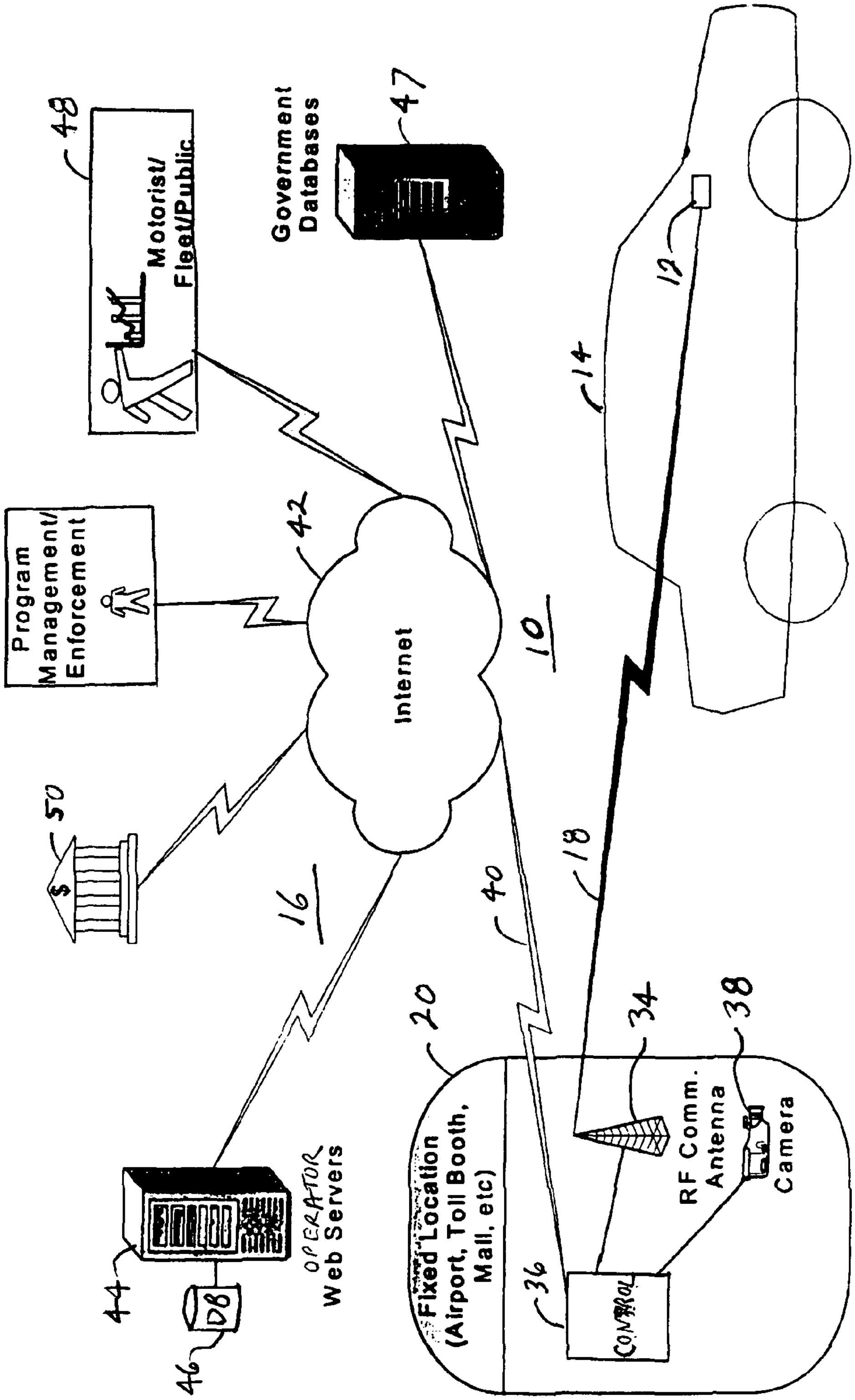
FIG. 1 is a block diagram of a vehicle exhaust emission inspection system and method, according to the invention.
Figure 2:
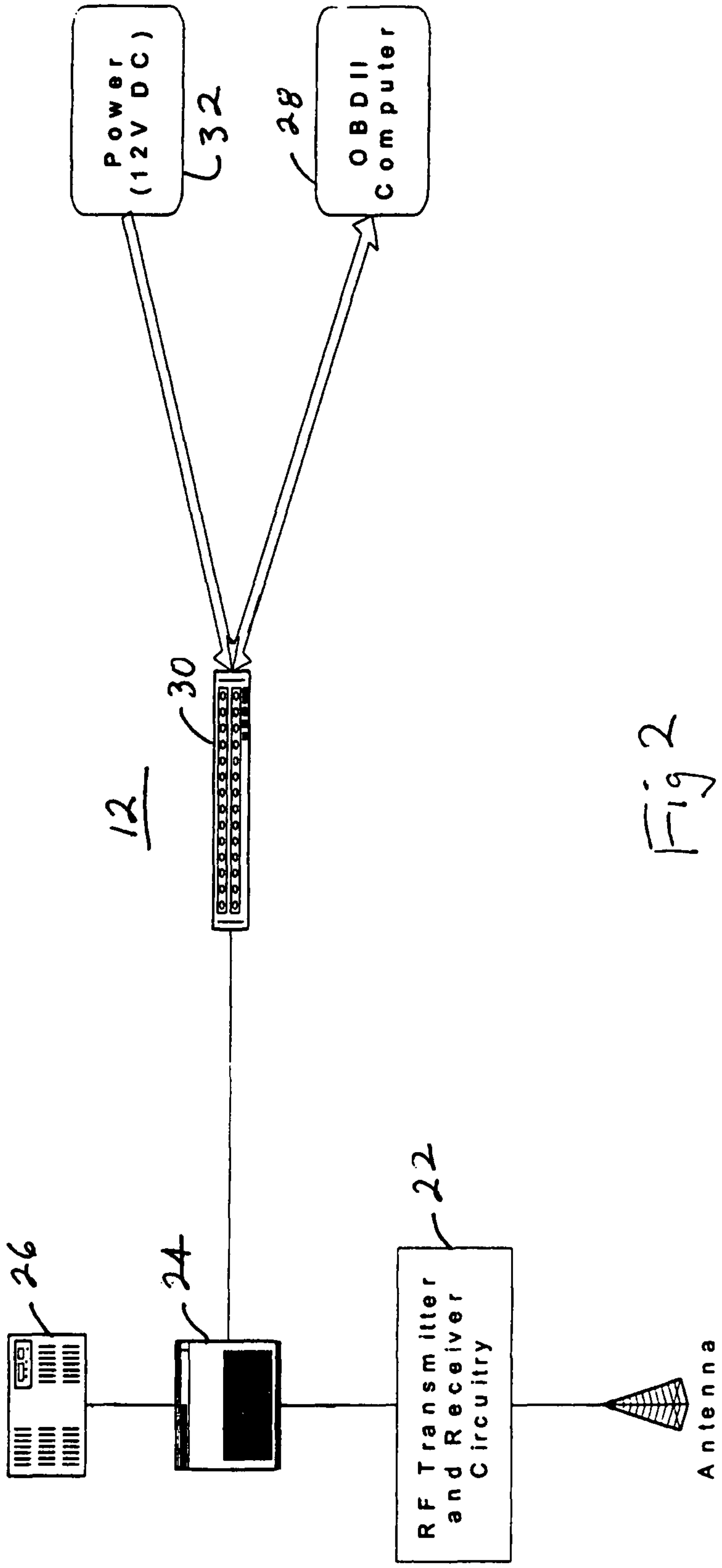
FIG. 2 is a block diagram of a vehicle unit.

Referring now to the drawings and the illustrative embodiments depicted therein, a vehicle exhaust emission inspection system 10 includes a vehicle unit 12 positioned within a vehicle 14 and a communication network 16 for wireless communication, shown at 18, with vehicle unit 12 (FIG. 1). Communication network 16 is made up of a plurality of geographically dispersed generally stationary units 20, each having a wireless communication transceiver, such as a two-way transceiver. Vehicle unit 12 communicates with a stationary unit 20 that is in the vicinity of the vehicle. Generally stationary units 20 may be positioned at various locations including airports, tollbooths, malls and other publicly accessible areas along roadways. Communication between the vehicle unit and the stationary unit may be by one of various wireless techniques, such as radio frequency (RF) techniques, and may utilize particular commercially available protocols such as Bluetooth, or the like. The hardware elements used to implement the stationary units and the vehicle units, such as the controls and the transceivers, are conventional and within information available to those skilled in the art.

Vehicle unit 12 includes a wireless communication transceiver 22, such as a two-way transceiver, and a control, such as a microprocessor-based control 24, for controlling communication transceiver 22. Control 24 includes memory 26, such as a flash memory, for storing vehicle exhaust emission data from a vehicle diagnostic system 28. Such diagnostic systems are conventional with modern vehicles and provide various vehicle operating data including vehicle speed, various engine parameters, and various exhaust emission parameters. In the illustrative embodiment, vehicle diagnostic system 28 is illustrated as an on-board digital (OBD) II computer system, although other diagnostic systems are available.

Vehicle unit 12 may include an adapter 30 in the form of a reader circuit configured to connect with vehicle diagnostic system 28, such as through a diagnostic port, or vehicle diagnostic link connector (DLC), for receiving at least exhaust emission data from diagnostic system 28. Such reader circuits are well known in the art and are commercially available in various diagnostic scan tools. Microprocessor 24 issues commands to the adapter 30 for it to issue commands to and receive data from the vehicle diagnostic system 28. Memory 26 stores relevant data, which may include vehicle exhaust emission parameters, for subsequent transmission to communication network 26, as will be explained in more detail below. Vehicle unit 12 is powered through a connection with a vehicle power source 32 which may be a separate connection or may be a connection through the vehicle diagnostic link connector (DLC). In this manner, vehicle unit 12 is powered whenever the vehicle is running. When the vehicle is powered up, vehicle data is stored in memory 26. When the vehicle is powered on, control 24 may check to ensure that the adapter is on the same vehicle by comparing current and old data. In the illustrative embodiment, vehicle unit 12 is adapted to be connected with the vehicle diagnostic link connector and, therefore, may be installed in existing vehicles. However, the invention comprehends incorporating vehicle unit 12 in the manufacturing of a vehicle.

Stationary unit 20 includes a wireless transceiver 34 for wireless communication 18 with vehicle unit 12 and a control system 36 for controlling transceiver 34. When a vehicle unit 12 is in the vicinity of stationary unit 20, vehicle unit 12 communicates data, such as vehicle exhaust emission parameters, via wireless communication 18 to that stationary unit 20. To assist this function, stationary unit 20 may serve as a beacon to activate a vehicle unit 12 in its vicinity to transmit its data. This may be accomplished by the two-way wireless communication capability of stationary unit 20. Therefore, a stationary unit 20 may repetitively send out a wireless beacon signal, which is received by a vehicle unit 12 in the vicinity of that stationary unit. In response to the wireless beacon signal, the vehicle unit 12 transmits vehicle data obtained from the vehicle diagnostic system and stored in memory 26, via wireless communication 18 to that stationary unit 20. The use of transceiver 34 to emit a beacon signal may minimize the requirement for communication regulatory controls and facilitates wireless communication 18 with vehicle unit 12 without recurring communication charges as may occur with a cellular system, or the like.

Stationary unit 20 may include an image capture device 38, such as a camera, in order to capture images of the vehicle 14 whose vehicle unit 12 is communicating exhaust emission data via wireless communication 18. The images may be still or may be video images of the vehicle and may serve the purpose of providing additional vehicle authentication, if required. Vehicle identification may include vehicle outline, vehicle color, structural details, and the like. License plate information could also be captured. Communication network 16 may include a network connection 40 with a wide area network, 42, such as a global network such as the Internet or other such network. Network connection 40 may be via a high-speed installed connection, such as cable, DSL, T1, or the like, or may be a wireless connection, such as a cellular connection, or may be a satellite connection, or the like. This connection with wide area network 42 allows data from each stationary unit 20 to be retrieved remotely at locations remote from the stationary units 20. Retrieving data from stationary units 20 may be done in real time or through batch processing.

Such remote retrieving may be in the form of a host computer system (HCS) 44 consisting of an enterprise network environment made up of one or more servers. Such HCS may provide a computing environment that is scalable to be used for vehicle fleets or geographical regions, such as city, states, or nations, or the like. Host computer system 44 may support a database 46 of historical vehicle data of vehicle 14, as well as other vehicles utilizing a vehicle unit 12. In this manner, when current vehicle data is retrieved from vehicle unit 12 via wireless communication 18, HCS 44 may compare the current vehicle data with the historical vehicle data for the vehicle. HCS 44 may utilize this comparison to determine if the vehicle is operating outside of normal operation as disclosed in detail in commonly assigned International Application Publication No. WO 01/86576, published on Nov. 15, 2001, entitled MONITORING OF VEHICLE HEALTH BASED ON HISTORICAL INFORMATION, the disclosure of which is hereby incorporated herein in its entirety by reference.

In addition, a government computer 47, incorporating an environmental protection database, may utilize vehicle exhaust emission data retrieved via wireless communication 18 and stationary unit 20 via global network 42 in order to determine compliance of the vehicle 14 with exhaust emission regulations. In this manner, the government may receive many data points from a vehicle, rather than once every one or two years as with conventional exhaust emission inspections.

Other users may utilize the data retrieved from the stationary units 20. By way of example, a vehicle owner, such as an individual owner or a fleet operator 48, may monitor vehicle data retrieved from unit 12 in order to monitor vehicle performance and identify vehicles that require maintenance. Additionally, communication network 16 may provide the ability to track the geographic location of unit 14 which may also be of interest to fleet operator 48.

Rather than utilizing separate access points 47 and 48, various users including the government, vehicle fleet operators and individual vehicle owners may be provided selective access to database 46 at HCS 44. Access to these various parties may be via a personal web page for each user that allows restricted access to that user as well as requires proper verification of the identification of that user. In this manner, by way of example, an individual vehicle owner may have access to vehicle data for that owner's vehicle and a fleet operator can have access to the data pertaining to the vehicles in that fleet. Governmental authorities may have a more global access to all records for the appropriate jurisdiction. However, such authority may be restricted from various information, such as account information, which will be discussed below, and the like.

Vehicle unit 12 may additionally be assigned a unique vehicle identification code. This unique vehicle identification code may be transmitted along with the vehicle data to the stationary unit. With the ability to uniquely identify the vehicle unit making the transmission, auxiliary data may also be transmitted along with the vehicle exhaust emission data for other purposes. By way of example, the auxiliary data may be utilized to perform automatic banking transactions pertaining to user operation of system 10, such as with an institution, illustrated as a bank 50. Such access may be for the purpose of charging the user for use of the system, such as on a transactional basis, including test fees, subscription fees, and the like. Other auxiliary data may be utilized for commercial applications, such as EZ-pass and other tollbooth-type applications, paying for food at take-out windows of fast-food restaurants, and the like. The ability to carry out such transaction is made possible by the use of a unique identification code that is matched to a particular vehicle. The personal web page set up with HCS for each user may also provide tools for managing the account set up for that user.

Inspection system 10 may incorporate other useful features. By way of example, communication network 16 may download, through wireless communication 18 to vehicle unit 12, code that may be used to program the vehicle unit 12. Additionally, self-testing may be incorporated into the inspection system in order to provide diagnostics for determining that the vehicle unit is properly operating. However, system 10 is not limited to exhaust emission inspections. It may be useful for general diagnostics and maintenance of vehicles. By way of example, the vehicle owner may be notified automatically, such as by E-mail if the owner's vehicle data is out of specification. All of this can be accomplished in a fully automated manner without any effort on behalf of the owner. Thus, the present invention provides a full, self-service paperless-based system.

Advantageously, inspection system 10 may perform vehicle exhaust emission inspections without manual intervention. Not only does this minimize the cost of determining compliance, but reduces inconvenience to the driver. Advantageously, inspection system 10 may be field retrofitted into existing vehicles thereby extending the advantage of a data collection system to older vehicles. Such a retrofit solution may be financed, for example, by incentives provided by the Government Compliance Agency.

Figure 3:
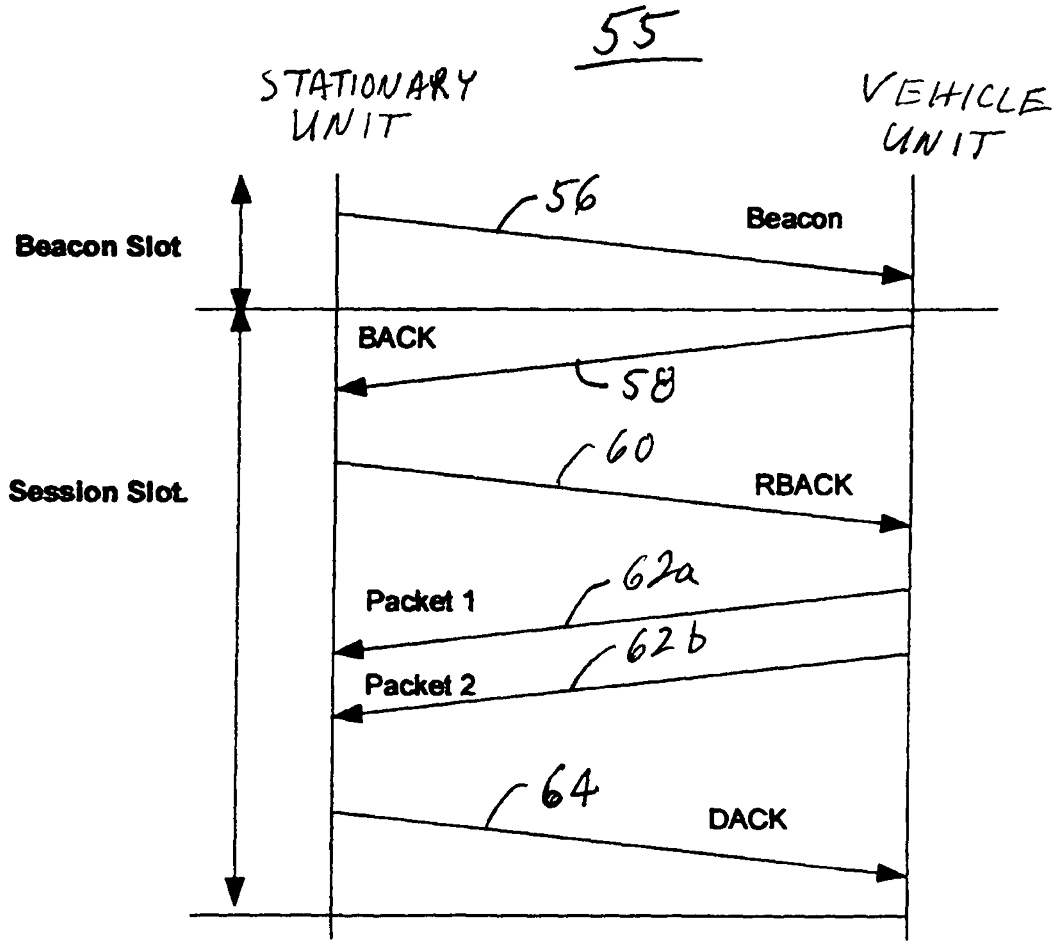
FIG. 3 is a diagram illustrating communication between a stationary unit and a vehicle unit.

An example of communication between stationary unit 20 and a vehicle unit 12 is illustrated in FIG. 3. Stationary unit 20 sends out, repetitively, a beacon 56 during a Beacon Slot. When the vehicle is within range of the beacon, the vehicle unit responds during a Session Slot with a BACK signal 58. The stationary unit then responds by sending a RBACK signal 60, which identifies which vehicle data the stationary unit wishes to receive. The vehicle unit responds by sending various data packets 62*a*, 62*b* of vehicle data. If the data is successfully received by the stationary unit, using conventional error checking techniques, an acknowledge signal 64 is sent. In the illustrative embodiment, the range of transmission of the stationary unit is 250 meters, but a greater or lesser range may be used.

Figure 4A:
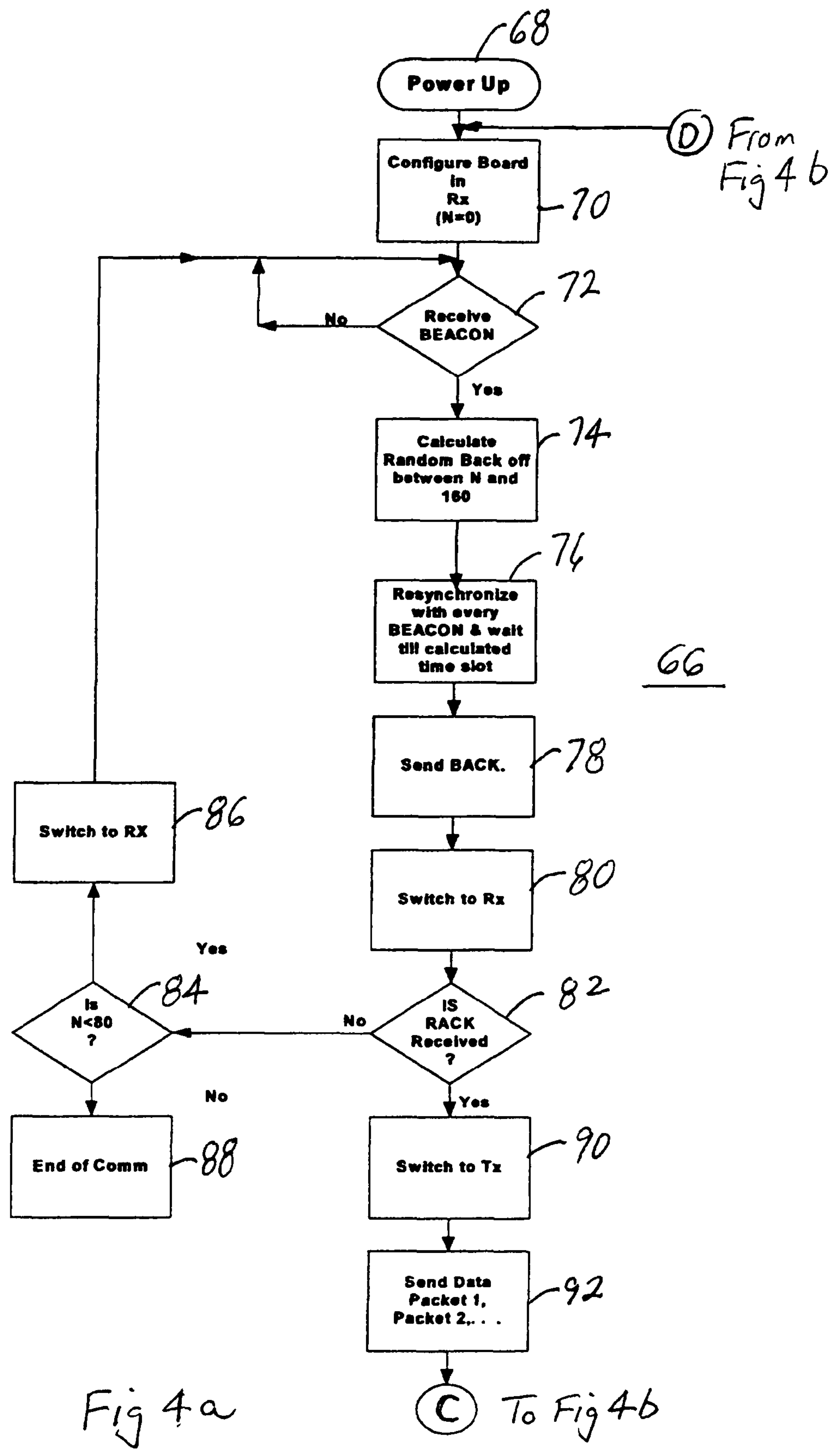
FIGS. 4*a* and 4*b* are flowcharts of a control program at a vehicle unit.
Figure 4B:
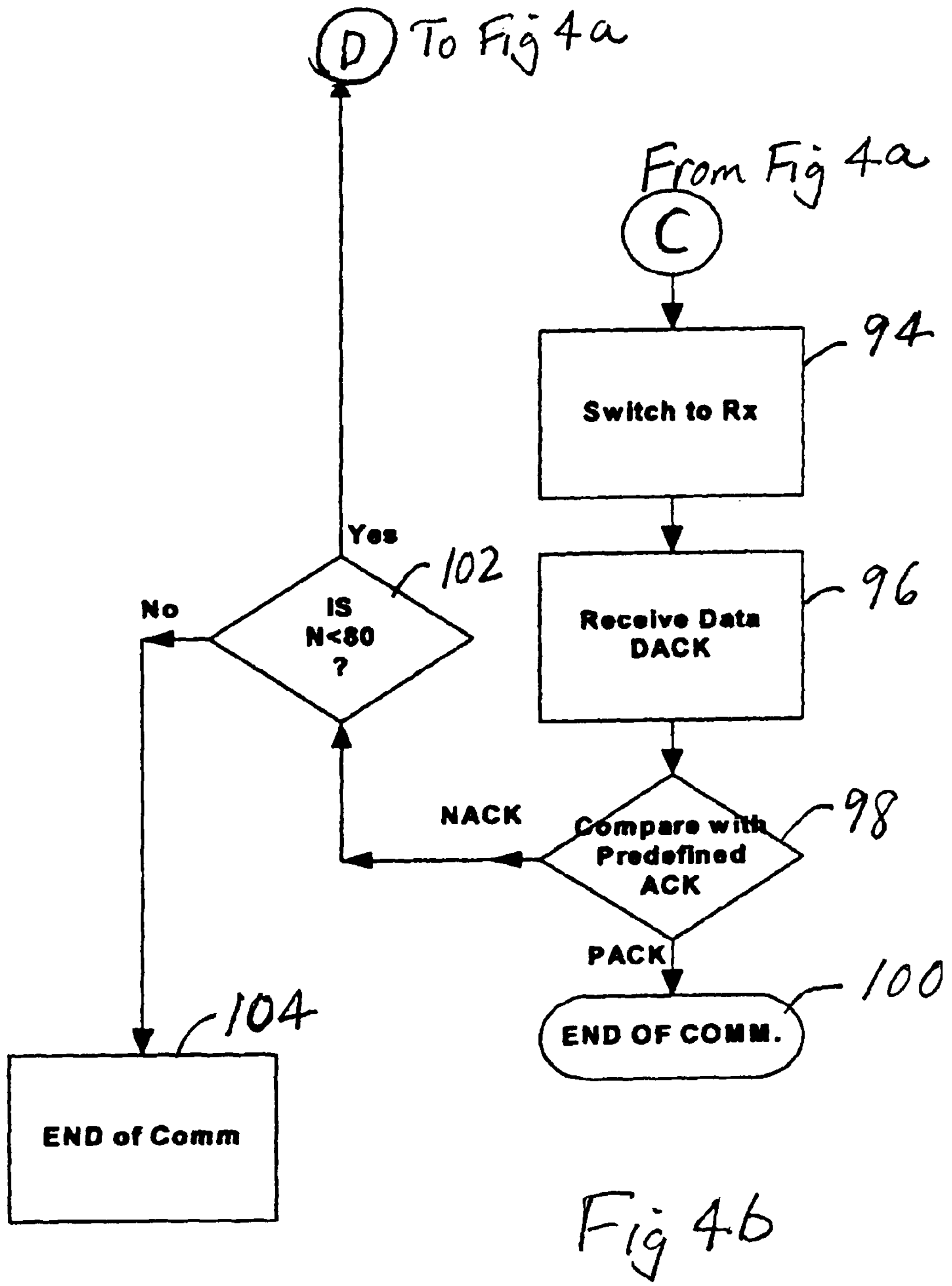

Operation of the vehicle unit is set forth in more detail in FIGS. 4*a* and 4*b*. Upon power-up at 68, the unit is initialized at 70 and attempts are made to receive a beacon at 72. Once a beacon is received, the vehicle unit synchronizes with the beacon at 74 and 76. The vehicle unit then sends a BACK signal at 78, switches to a receive mode at 80 and looks for the RBACK signal at 82. After a number of attempts (84, 86) communication is ended at 88. Once the RBACK signal is received, the unit is switched to transmitting at 90, packets 62*a*, 62*b* are sent at 92 and the unit is switched to receiving at 94 to look for the acknowledge signal at 96 and 98. After a number of attempts at 102, communication is terminated at 104. If acknowledge is received at 98, communication is terminated at 100.

Figure 5A:
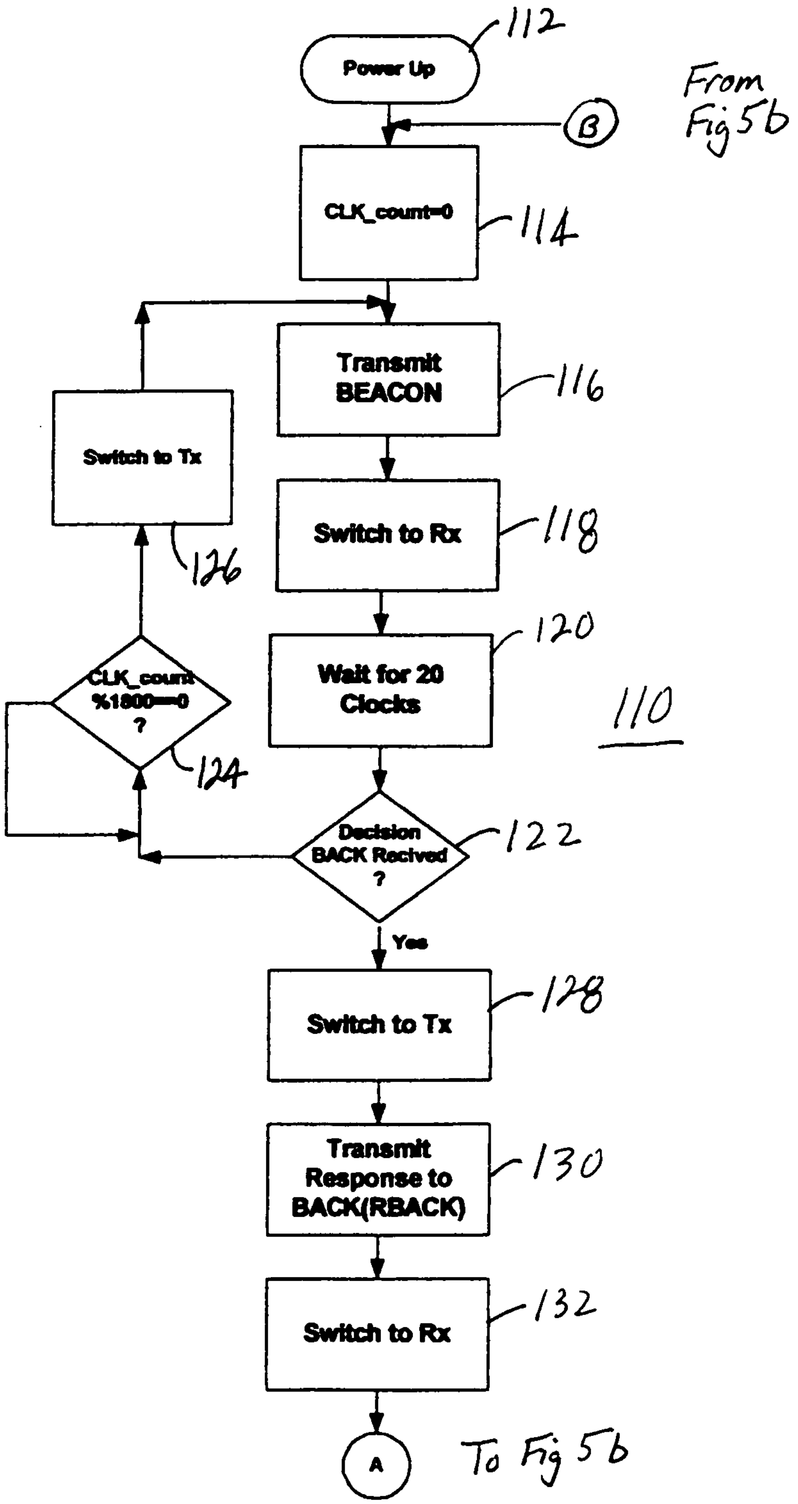
FIGS. 5*a* and 5*b* are flowcharts of a control program at a stationary unit.
Figure 5B:
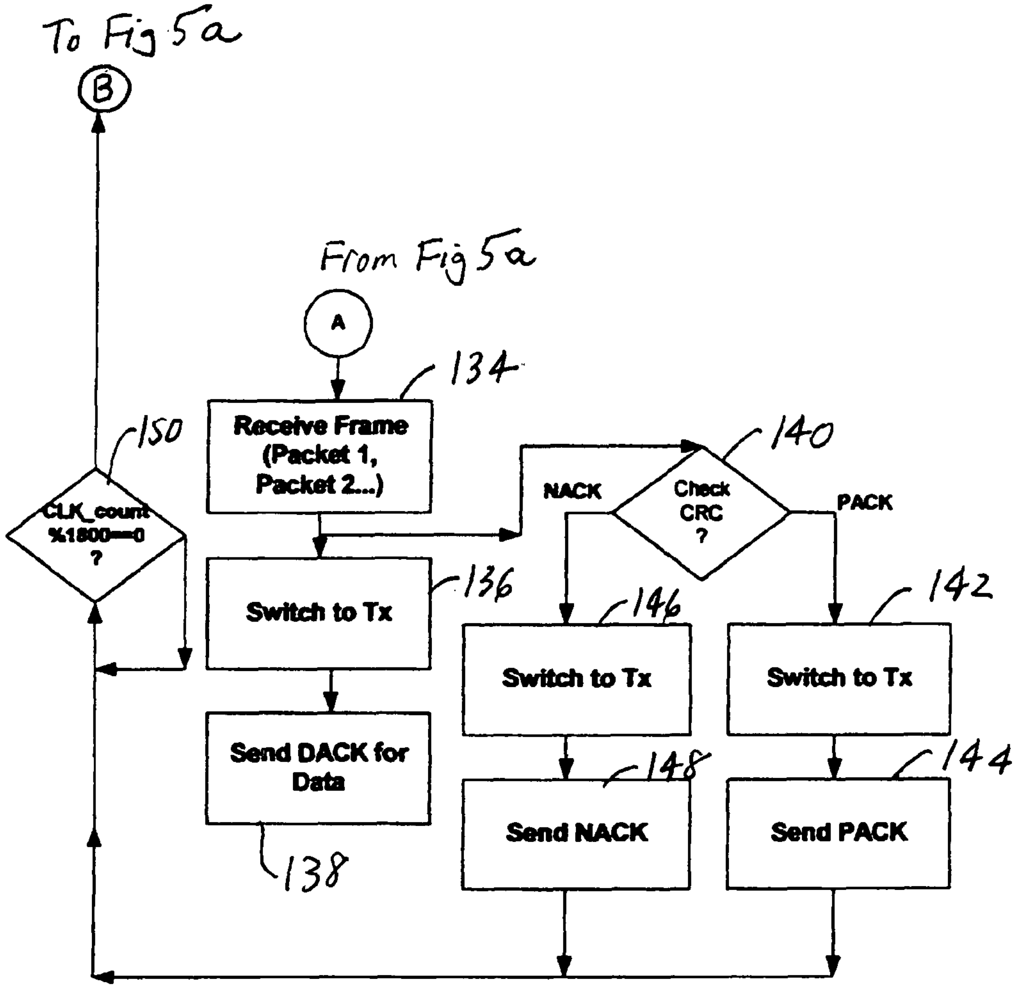

Operation of the stationary unit is set forth in more detail in FIGS. 5*a* and 5*b*. After power-up at 112 and initialization at 114, the beacon 56 is repetitively transmitted at 116. The unit then switches to a receive mode at 118 and waits at 120 for a BACK signal (122, 124, 126). Once received, the unit switches to a transmit mode at 128 and sends an RBACK signal at 130. The unit then switches to a receive mode at 132 and receives, at 134, data packets sent by the vehicle unit. They are checked for validity at 140 and either an acknowledge signal is sent (142, 144, 150) or a non-acknowledge signal is sent (146, 148, 150).

Changes and modifications in the specifically described embodiments can be carried out without departing from the principles of the invention which is intended to be limited only by the scope of the appended claims, as interpreted according to the principles of patent law including the Doctrine of Equivalents.

The embodiments in which an exclusive property or privilege is claimed are as follows:

1. A method of verifying regulatory compliance of a vehicle having a vehicle diagnostic system including a diagnostic port, said method comprising:

providing a vehicle unit comprising an adapter that is configured to connect with the vehicle diagnostic port of the vehicle diagnostic system, said vehicle unit further comprising a vehicle wireless transceiver and a memory;

connecting said adapter with the vehicle diagnostic port and receiving vehicle data including exhaust emission parameters with said adapter;

storing in said memory the vehicle data including exhaust emission parameters received from the vehicle diagnostic system;

providing a communication network for two-way wireless communication with said vehicle unit, said communication network made up of a plurality of geographically dispersed wireless communication transceivers;

activating said vehicle wireless communication transceiver with one of said geographically dispersed wireless communication transceivers in response to the vehicle bringing said vehicle wireless communication transceiver within a vicinity of that one of said geographically dispersed wireless communication transceivers to communicate the stored vehicle data to that one of said geographically dispersed wireless communication transceivers;

providing a host computer system with access to said communication network and receiving vehicle data from said geographically dispersed wireless communication transceivers with said host computer system;

providing a database accessed by said host computer system;

collecting environmental regulatory compliance data with said database from vehicle data received from said geographically dispersed wireless communication transceivers; and providing access by environmental authority to said database to verify regulatory compliance; and checking to ensure that said adapter is on the same vehicle when the vehicle is powered on by comparing current vehicle data with stored vehicle data.

2. The method of claim 1 including providing a network connection at said geographically dispersed wireless communication transceivers with a wide area network; and retrieving vehicle data from said geographically dispersed wireless communication transceivers with said wide area network and providing access to the retrieved vehicle data with said host computer system.

3. The method of claim 2 wherein said network connection comprises at least one chosen from a high speed installed connection, a wireless connection and a satellite connection.

4. The method of claim 1 including comparing current vehicle data with historical vehicle data to determine if the vehicle is operating outside of normal operation.

5. The method of claim 1 including providing access by a vehicle owner to said database for vehicle performance monitoring.

6. The method of claim 1 including providing a unique vehicle identification code and transmitting said identification code with the vehicle data.

7. The method of claim 6 wherein said vehicle data includes auxiliary data in addition to the exhaust emission.

8. The method of claim 1 including programming said vehicle unit through said vehicle transceiver with code received from said geographically dispersed wireless communication transceivers.

9. The method of claim 1 including tracking the geographic location of said vehicle unit with said communication network.

10. The method of claim 1 including providing cameras with said geographically dispersed wireless communication transceivers and capturing images with said cameras of vehicles communicating exhaust emission data and identifying the vehicles from the captured images.

11. The method of claim 1 wherein said vehicle wireless communication transceiver communicates vehicle data to one of said geographically dispersed wireless communication transceivers without communication charges between said vehicle unit and that one of said geographically dispersed wireless communication transceivers.

12. The method of claim 1 including uniquely identifying the vehicle making the transmission.

13. The method of claim 1 wherein said activating comprises each said geographically dispersed wireless communication transceiver repetitively sending a wireless signal and said vehicle unit communicating the stored vehicle data to that one of said geographically dispersed wireless communication transceivers in response to receipt of the wireless signal from that one of said geographically dispersed wireless communication transceivers.

14. A method of verifying regulatory compliance of a vehicle having a vehicle diagnostic system including a diagnostic port, said method comprising:

providing a vehicle unit comprising an adapter that is configured to connect with the vehicle diagnostic port of the vehicle diagnostic system, said vehicle unit further comprising a vehicle wireless transceiver and a memory;

connecting said adapter with the vehicle diagnostic port and receiving vehicle data including exhaust emission parameters with said adapter;

storing in said memory the vehicle data including exhaust emission parameters received from the vehicle diagnostic system;

providing a communication network for two-way wireless communication with said vehicle unit, said communication network made up of a plurality of geographically dispersed wireless communication transceivers;

activating said vehicle wireless communication transceiver with one of said geographically dispersed wireless communication transceivers in response to the vehicle bringing said vehicle wireless communication transceiver within a vicinity of that one of said geographically dispersed wireless communication transceivers to communicate the stored vehicle data to that one of said geographically dispersed wireless communication transceivers;

providing a host computer system with access to said communication network and receiving vehicle data from said geographically dispersed wireless communication transceivers with said host computer system;

providing a database accessed by said host computer system;

collecting environmental regulatory compliance data with said database from vehicle data received from said geographically dispersed wireless communication transceivers; and providing access by environmental authority to said database to verify regulatory compliance;

wherein said activating comprises each said geographically dispersed wireless communication transceiver repetitively sending a wireless signal and said vehicle unit communicating the stored vehicle data to that one of said geographically dispersed wireless communication transceivers in response to receipt of the wireless signal from that one of said geographically dispersed wireless communication transceivers;

wherein said activating is in response to said vehicle wireless communication transceiver being in a vicinity of approximately 250 meters from that one of said geographically dispersed wireless communication transceivers.

15. The method of claim 14 wherein each of said geographically dispersed wireless communication transceivers attempts to receive stored vehicle data after sending the wireless signal.

16. A method of verifying regulatory compliance of a vehicle having a vehicle diagnostic system including a diagnostic port, said method comprising:

providing a vehicle unit comprising an adapter that is configured to connect with the vehicle diagnostic port of the vehicle diagnostic system, said vehicle unit further comprising a vehicle wireless transceiver and a memory;

connecting said adapter with the vehicle diagnostic port and receiving vehicle data including exhaust emission parameters with said adapter;

storing in said memory the vehicle data including exhaust emission parameters received from the vehicle diagnostic system;

checking to ensure that said adapter is connected with the same vehicle;

providing a communication network for two-way wireless communication with said vehicle unit, said communication network made up of a plurality of geographically dispersed wireless communication transceivers;

activating said vehicle wireless communication transceiver with one of said geographically dispersed wireless communication transceivers in response to the vehicle bringing said vehicle wireless communication transceiver within a vicinity of that one of said geographically dispersed wireless communication transceivers to communicate the stored vehicle data to that one of said geographically dispersed wireless communication transceivers;

providing a host computer system with access to said communication network and receiving vehicle data from said geographically dispersed wireless communication transceivers with said host computer system;

providing a database accessed by said host computer system;

collecting environmental regulatory compliance data with said database from vehicle data received from said geographically dispersed wireless communication transceivers; and providing access by environmental authority to said database to verify regulatory compliance.

17. The method of claim 16 including providing a network connection at said geographically dispersed wireless communication transceivers with a wide area network; and retrieving vehicle data from said geographically dispersed wireless communication transceivers with said wide area network and providing access to the retrieved vehicle data with said host computer system.

18. The method of claim 17 wherein said network connection comprises at least one chosen from a high speed installed connection, a wireless connection and a satellite connection.

19. The method of claim 16 including providing a unique vehicle identification code and transmitting said identification code with the vehicle data.

20. The method of claim 19 wherein said vehicle data includes auxiliary data in addition to the exhaust emission.

21. The method of claim 16 including programming said vehicle unit through said vehicle transceiver with code received from said geographically dispersed wireless communication transceivers.

22. The method of claim 16 including tracking the geographic location of said vehicle unit with said communication network.

23. The method of claim 16 including providing cameras with said geographically dispersed wireless communication transceivers and capturing images with said cameras of vehicles communicating exhaust emission data.

24. The method of claim 16 including checking to ensure that said adapter is on the same vehicle when the vehicle is powered on by comparing current vehicle data with stored vehicle data.

25. The method of claim 16 wherein said vehicle wireless communication transceiver communicates vehicle data to one of said geographically dispersed wireless communication transceivers without recurring communication charges between said vehicle unit and that one of said geographically dispersed wireless communication transceivers.

26. The method of claim 16 including performing said checking when the vehicle is powered on.

27. The method of claim 16 wherein said activating comprises each said geographically dispersed wireless communication transceiver repetitively sending a wireless signal and said vehicle unit communicating the stored vehicle data to that one of said geographically dispersed wireless communication transceivers in response to receipt of the wireless signal from that one of said geographically dispersed wireless communication transceivers.

28. The method of claim 27 wherein said activating is in response to said vehicle wireless communication transceiver being in a vicinity of approximately 250 meters from that one of said geographically dispersed wireless communication transceivers.

29. The method of claim 28 wherein each of said geographically dispersed wireless communication transceivers attempts to receive stored vehicle data after sending the wireless signal.

* * * * *